United States Patent
Paya

[11] Patent Number: 5,688,081
[45] Date of Patent: Nov. 18, 1997

[54] CUTTING INSERT WITH TRAPEZOIDAL INDENTATIONS ALONG THE CUTTING EDGE

[75] Inventor: José Agustin Paya, Mühlheim, Germany

[73] Assignee: Widia GmbH, Essen, Germany

[21] Appl. No.: 244,853

[22] PCT Filed: Dec. 7, 1992

[86] PCT No.: PCT/DE92/01027

§ 371 Date: Jun. 10, 1994

§ 102(e) Date: Jun. 10, 1994

[87] PCT Pub. No.: WO93/11898

PCT Pub. Date: Jun. 14, 1993

[30] Foreign Application Priority Data

Dec. 14, 1991 [DE] Germany .............. 41 41 368.7

[51] Int. Cl.[6] ..................................... B23B 27/16
[52] U.S. Cl. ........................................... 407/115
[58] Field of Search ........................... 407/114–116

[56] References Cited

U.S. PATENT DOCUMENTS

| | | | |
|---|---|---|---|
| 4,273,480 | 6/1981 | Shirai et al. | 407/114 |
| 4,934,879 | 6/1990 | van Barneveld | 407/115 |
| 4,988,242 | 1/1991 | Pettersson et al. | 407/116 |
| 5,074,720 | 12/1991 | Loqvist et al. | 407/114 |

FOREIGN PATENT DOCUMENTS

| | | |
|---|---|---|
| 0 414 241 A2 | 2/1991 | European Pat. Off. . |
| 0 480 576 A1 | 9/1991 | European Pat. Off. . |
| 37 31 426 A1 | 4/1989 | Germany . |
| 1-51206 A | 2/1989 | Japan . |
| 1 378 342 | 12/1974 | United Kingdom . |
| WO89/02328 | 3/1989 | WIPO . |

*Primary Examiner*—M. Rachuba
*Assistant Examiner*—Kenneth J. Hansen
*Attorney, Agent, or Firm*—Herbert Dubno; Andrew Wilford

[57] ABSTRACT

The invention relates to a cutting insert for chip-forming machining, in particular for roughing of metallic workpieces with a high feed speed. To increase the chip movement during cutting it is suggested that indentations (14) be provided in the region of a cutting edge (12) which are arranged in a row extending along the cutting edge (12), which interrupt same and which have a generally trapezoidal sectional shape parallel to the cutting edge (12) and perpendicular to the chip surface (10) with trapezoidal sides open toward the chip surface, the indentations having a chip-surface base extending at a negative or 0° chip angle (19) to the cutting edge (12), the chip surface (16) in the region between the indentations (14) at the cutting edge (12) has a positive chip angle (17).

20 Claims, 12 Drawing Sheets

CUTTING INSERT WITH TRAPEZOIDAL INDENTATIONS ALONG THE CUTTING EDGE

CROSS REFERENCE TO RELATED APPLICATIONS

This application is the US national phase of PCT application PCT/DE92/01027 filed 7 Dec. 1992 with a claim to the priority of German application P 41 41 368.7 filed 14 Dec. 1991.

FIELD OF THE INVENTION

The invention relates to a cutting insert for chip-forming machining, in particular for rough machining of metallic workpieces with a high feed rate having a chip surface which is provided in the region of a cutting edge with indentations which are arranged in a row extending along the cutting edge, which interrupt same and which have a generally trapezoidal sectional shape parallel to the cutting edge and perpendicular to the chip surface with trapezoid sides open toward the chip surface.

BACKGROUND OF THE INVENTION

Cutting inserts of this type are known from the prior art, e.g. from EP 414,241. Such a cutting insert has indentations on its edge surface as well as on its chip surface which overlap in the region of the cutting edge so that the cutting edge is set back in the region of the indentations relative to the remaining portions of the cutting edge. The actual trapezoidal shape has sharp edges which are hard to maintain for long times. In addition even with this arrangement the friction as chips pass over it is considerable. Disadvantageously the cutting insert in this reference can only be used for a particular setup.

Further cutting inserts with indentations are known from German 2,849,610. As a result of the substantial width of the inserts at the actual cutting edge a substantially increased plastic deformation or stiffening of the passing chips is achieved. The indentations are in top view generally round to square with rounded transitions and corner regions in the chip surface. A comparable cutting plate is described in U.S. Pat. No. 4,447,175 where a row of concave recesses is provided along the cutting edge with the cutting edge uninterrupted. The recesses are generally rectangular seen in top view.

U.S. Pat. No. 3,973,308 also describes recesses that are in top view rectangular or even triangular and that also do not reach to the cutting edge but start in a region at a bevel of the cutting edge and that extend inward down into a chip groove. This embodiment also is intended to reduce the temperature and forces exerted on the chip surface during machining.

Similarly to reduce the thermal and mechanical load during machining operations German 3,731,426 suggests a cutting insert with a corrugated cutting edge where the chip surface is corrugated parallel and perpendicular to the cutting edge.

OBJECTS OF THE INVENTION

It is an object of the present invention to develop a cutting insert of the above-described type which has even at high feed speeds a stable guiding and diversion of the chips with minimal wear to the cutting edge. Furthermore the cutting insert should be simple in construction and also simple to make.

ACCORDING TO THE INVENTION

The solution is the cutting insert which is characterized in that the indentations have a chip-surface base extending at a negative chip angle or a 0° chip angle for the case of an indentation with a positive chip angle. The chip surface in the region between the indentations at the cutting edge has a positive chip angle of at least 5°. To avoid sharp-edge transitions between the indentations and the surrounding chip surface in the region of the cutting edge the transitions are preferably rounded, preferably with a radius from 0.3 to 3 mm.

This cutting insert causes a plastic deformation of the chip passing over it with minimal force and friction. The chip shaping as well as the chip guiding are positively influenced by the negative chip angle of the indentations. In general the negative chip angle of the indentations interrupting the cutting edge stabilizes the cutting edge so that high feed rates can be used without the danger of breaking off parts of the cutting edge. The trapezoidal section is not only clearly defined during manufacture of the cutting insert but can be made without great cost which works out cost efficiently. In addition according to the application the cutting insert is to be put to, variations are possible such as conforming the depth of the indentations to the use conditions, that is the cutting speed, cutting depth, feed rate, and the type of workpiece being machined. The chips are deformed and deflected, in contrast to most of the prior-art systems with bumps or grooves in the chip surface, directly at the cutting edge and the type of deformation is set in accordance with the depth and width of the indentations relative to the surrounding chip surface.

The positive chip angle substantially increases the cutting capacity and the feed rate.

preferably the trapezoidal shape of the indentations is axially symmetrical to a perpendicular from the cutting edge, that is both sides of the trapezoid are at the same angle to the chip surface or the chip-surface base of the indentations. In this manner one-sided or point-like overloading of the cutting edge is avoided.

According to a further embodiment of the invention the indentations at the cutting corners each have trapezoidal sides with a steep inclination angle and/or narrow trapezoidal bases and/or small spacings between the indentations. In particular in the cutting-corner region one can deviate from a uniform shaping of the indentations so that the corner that is heavily loaded by the chip section greatly deforms the passing chip in order to give the necessary stiffness to ensure the desired chip breaking.

preferably the trapezoid side angles measured at the negative chip surface are between 110° and 160°. The negative chip angle of the trapezoid base of the indentation lies between 0° and 20°, preferably between 5° and 15°. The positive chip angle of the chip surface surrounding the indentations is between 5° and 25°, preferably 5° and 20°. It has further been shown to be advantageous to set the spacings of the indentations smaller than the width of the indentations.

The formation of the indentions seen in a top view on the chip surface is optional but a narrowing of the indentations toward the chip-surface center in a trapezoidal or triangular shape causes the neighboring regions of positive chip angle to also converge toward the cutting edge and thus enter like a wedge into the material being machined.

There are also advantages in manufacturing. Preferably the geometry of the indentions seen in a top view on the chip surface are trapezoidal. The width of the indentations at the cutting edge is between 0.5 and 4 mm so that at least three or four indentations can be formed on each cutting edge. The relationship of width to depth of the indentations is 6:1, preferably according to profile 3:1 or 4:1.

According to a further embodiment of the invention the cutting edge has a bevel whose angle with the positive chip-surface region between the indentions is the same as the angle between this bevel and the negative chip-surface base of the indention. In other words the bevel follows the geometrical path of the surfaces which are behind the bevel. This reduces stress on the chip in the edge region at the bevel so as to reduce compressing and breaking it. This angle lies according to a further embodiment of the invention between 160° and 170°. To further destress the chip the indentation and/or the surrounding chip surface is formed with an additional chip groove.

Additional chip forming can be done by raised chip-forming elements, preferably shaped as pyramidal or conical frustums, when the chip surface surrounding the indentation is formed at a spacing form the cutting edge with such chip-forming elements.

In addition the chip surface has along the cutting edge from cutting corner to cutting corner a convex or concave envelope curve so that the depth and/or spacing of the indentations increases from the cutting corners to the cutting-edge middle.

BRIEF DESCRIPTION OF THE DRAWINGS

FIG. 5 is a section taken along the line 4—4 of FIG. 1;

FIG. 9 1s a section taken along the line 8—8 of FIG. 1;

SPECIFIC DESCRIPTION

Figure 1:
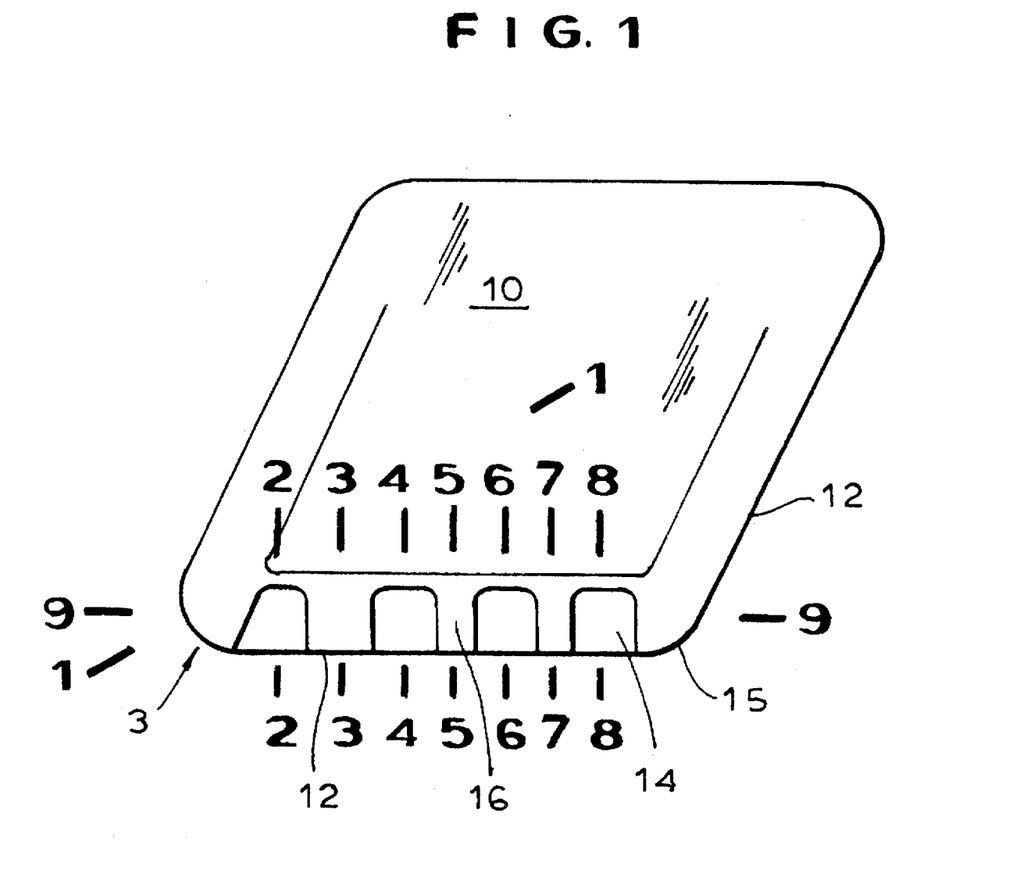
FIG. 1 is a top view of a cutting insert.
Figures 2, 3, 4, 6, 7, 8:
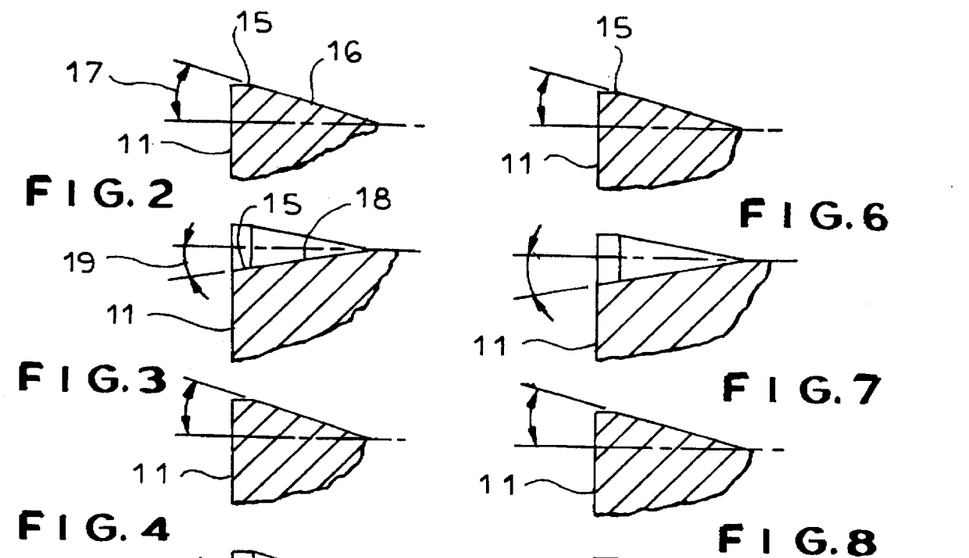
FIG. 2 is a cross section taken along the line 1—1 of FIG. 1.
FIG. 3 is a section taken along the line 2—2 of FIG. 1.
FIG. 4 is a section taken along the line 3—3 of FIG. 1.
FIG. 6 is a section taken along the line 5—5 of FIG. 1.
FIG. 7 is a section taken along the line 6—6 of FIG. 1.
FIG. 8 is a section taken along the line 7—7 of FIG. 1.
Figures 5, 9:
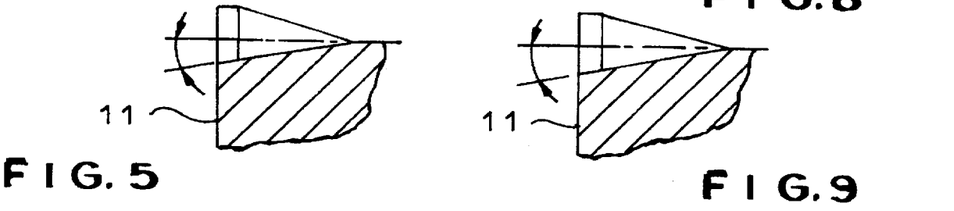

As shown in FIG. 1 the cutting insert has a chip surface 10 which forms a cutting edge 12 together with each of the edge surfaces 11 which extend perpendicular or at a free angle thereto. In this case the plate is rhombic and thus has four cutting corners 13. This principle applies for the formation of the cutting insert in other shapes, e.g. triangular. Each cutting edge is formed with and interrupted by indentations 14 which extend in a row running along the cutting edge 12. These indentations have seen in cross section or in a side view at the edge surface a trapezoidal shape where the shorter of the two parallel sides of the trapezoid form the indentation and the sides of the trapezoid diverge toward the chip surface 10.

The cutting insert shown in FIG. 1 also has a peripheral bevel or 1 and 15 around the cutting edge 12.

As seen in FIG. 2, FIG. 4, FIG. 6 and FIG 8; the bevel 15 runs at an angle of about 90° to the edge surface 11. A descending chip-surface part 16 forms an angle 17 of 5° to 20° with the bevel 15. As visible from the sections of FIG. 3, FIG. 5, FIG. 7 and FIG. 9 an indentation 14 is formed between the abovedescribed chip surface portions along which the bevel 15 also runs.

The indentation has a chip-surface base 18 which is inclined at an angle 19 of about 10° to 15° to the horizontal so that it runs negatively. As also particularly visible in FIG. 12 the angle of the bevel 15 to the descending chip-surface part 16 on the one side and to the chip-surface base 18 on the other side are the same. Here the bevel is more negatively inclined toward the cutting edge in the region of the cutting edge than the chip-surfaces base 18 of the indentation.

Figure 10:
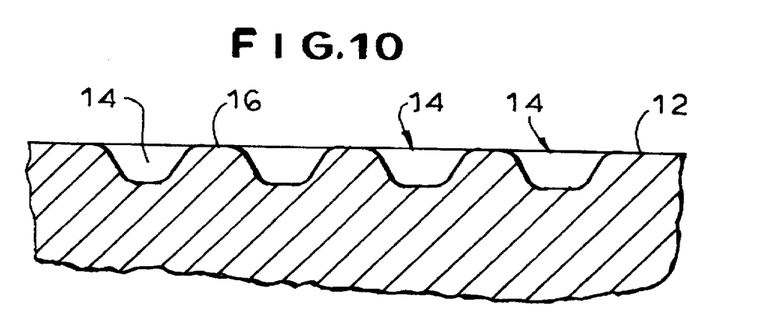
FIG. 10 is a section taken along the line 9—9 of FIG. 1.
Figure 11:
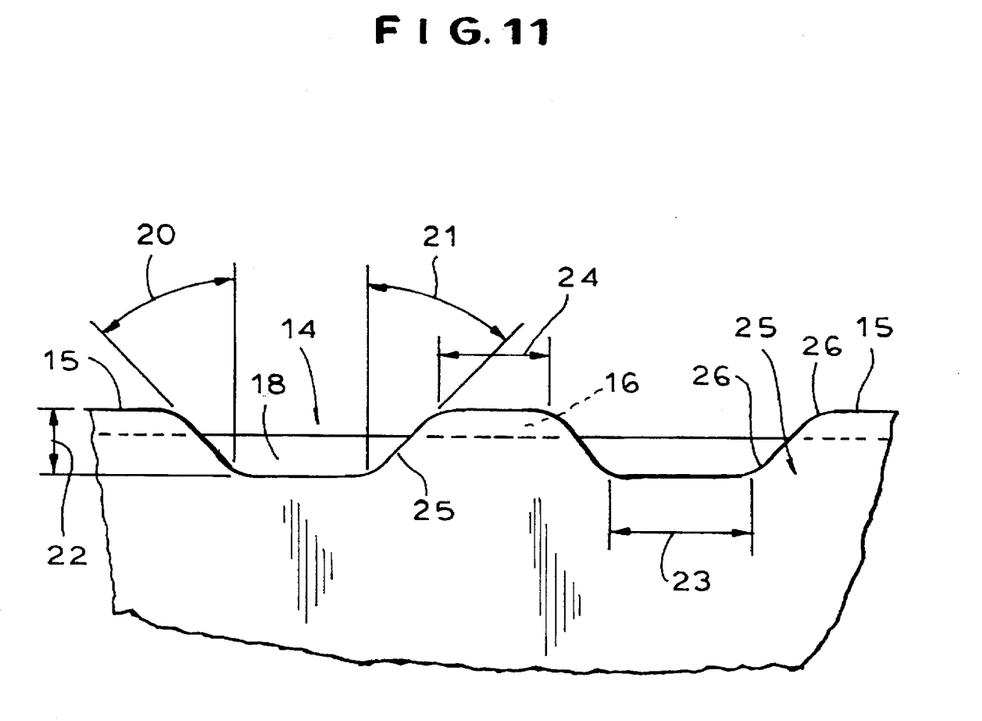
FIG. 11 is an enlarged detail view of a cutting edge.
Figure 12:
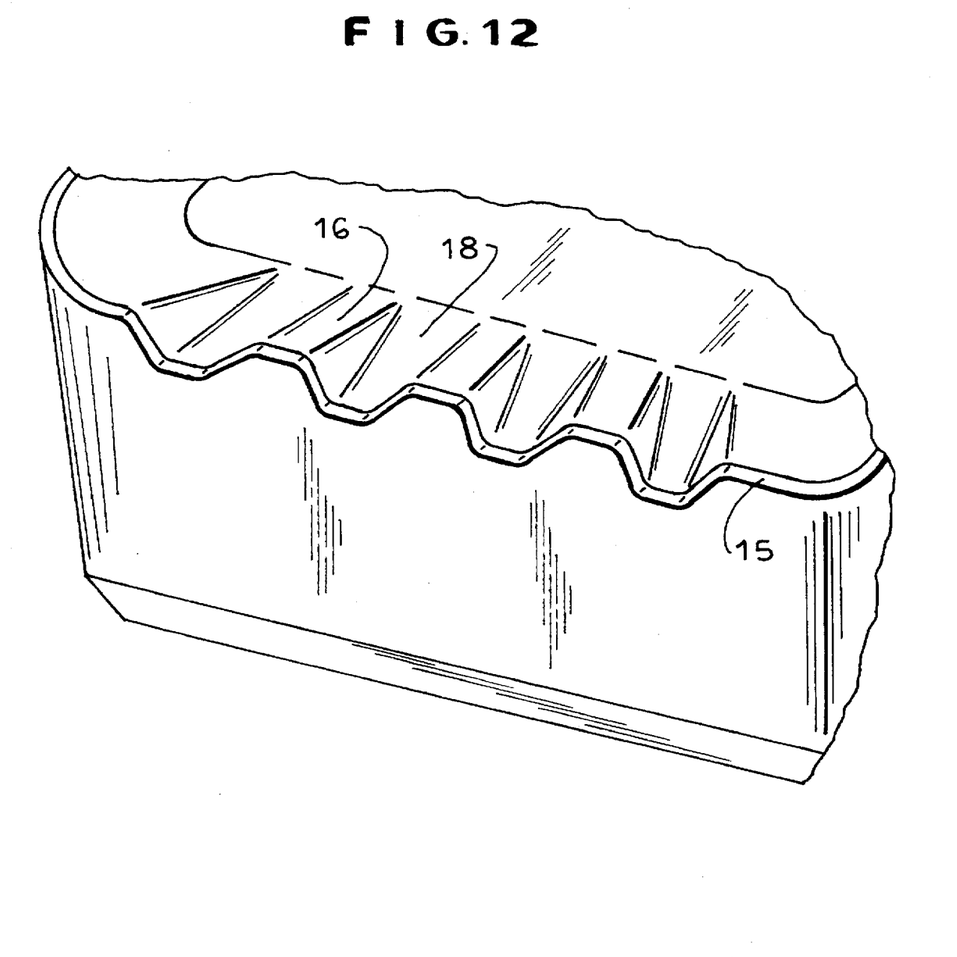
FIG. 12 is a perspective view of the cutting edge according to FIG. 1.

As visible in FIGS. 1, 11 and 12 the indentations 14 are aligned in a row along the cutting edge 12 at spacings that can be the same or different. As visible from the section of FIG. 10 of the indentations 14 alternate with the chip-surface regions 16 likes hills and valleys. The transitions from the indentations 14 to the chip-surface parts 16 are formed rounded. Normally the trapezoidal shapes of the indentations 14 are made symmetrical, that is the trapezoid side angles 20 and 21 are the same size, here 45°. With this inclination angle 19 of the cutting surface bases 18 of the indentations 14 there is a depth 22 relative to the bevel 15 or chip surfaces 16. The transition from the trapezoid sides 25 to the chip-surface base 18 has rounding like the transition from the trapezoid side 25 to the bevel 15 or to the chip surface 16. With uniformly spaced indentations the width 24 of the positively inclined chip surface 16 as well as the width 23 of the chip-surface base 18 running at a negative chip angle 19 are defined. As also described below the height 22 and the trapezoid-side angle 20 can be varied with respect to the width 23 or 25 in order to conform the cutting insert to other desired cut conditions. As clearly shown in FIG. 1 the trapezoid side 25 closest to the cutter corner can be formed with a larger trapezoid angle 20 (see FIG. 11), that is the trapezoid side can run more flatly to the cutter corner.

Figure 13:
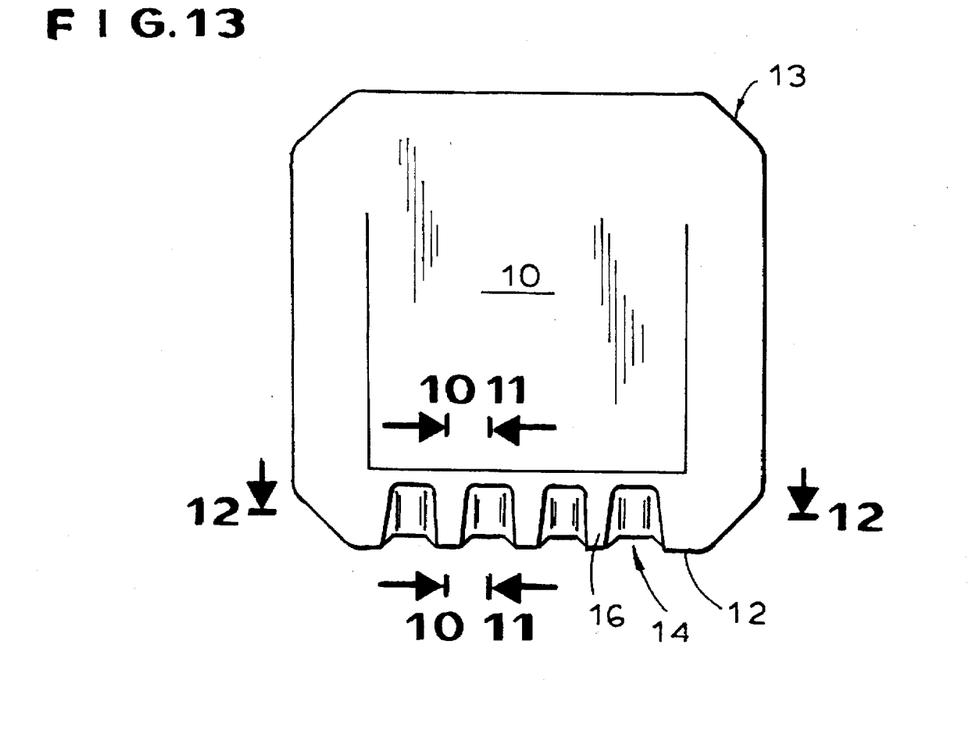
FIG. 13 is a top view of a cutting insert with a perspective free angle.
Figure 14:
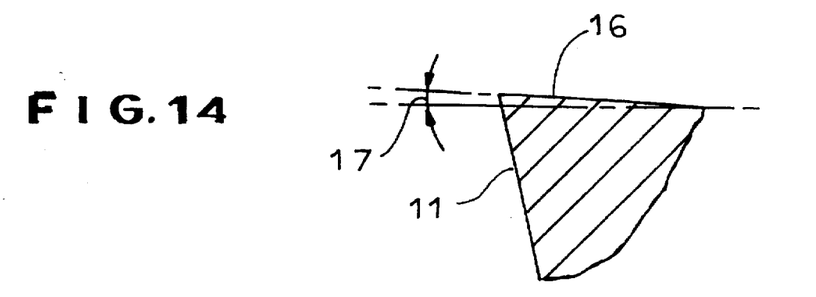
FIG. 14 is a section taken along the line 10—10 of FIG. 2.
Figure 15:
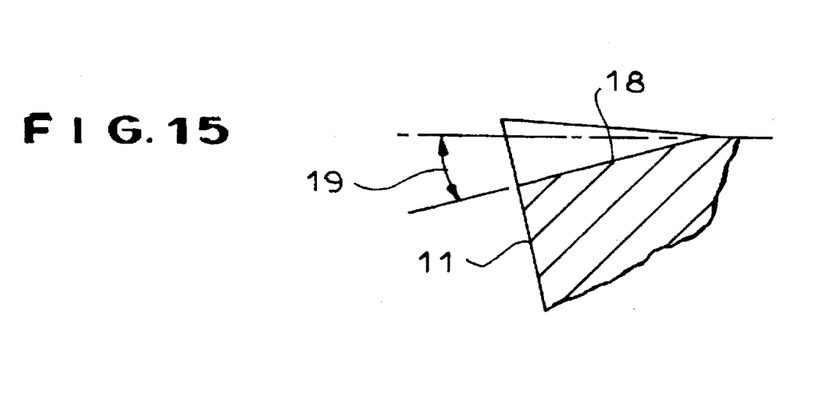
FIG. 15 is a section taken along the line 11 of FIG. 2.

The cutting plate shown in FIGS. 13 to 15 is generally square and has cutting corners 13 provided with bevels. Four recesses 12 extend along the cutting edge 12 and have cross sections with positive chip angles 17 or negative chip angles 19. In contrast to the embodiments shown in FIGS. 2–10 here the cutting edge is formed by the chip surface 16 and the negatively set edge surface 11 or the cutting surface base 18 and the surface 11. The cutting edge 12 is set somewhat back in the region of the indentations 14.

Figure 16:
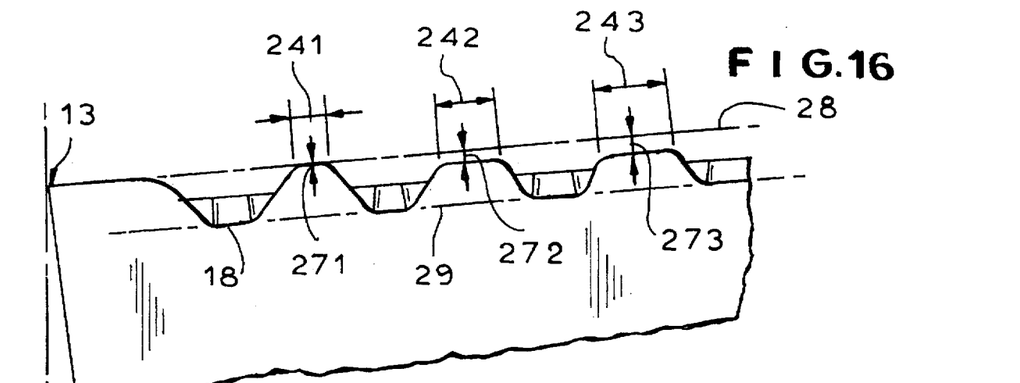
FIG. 16 is an elevational view in a plane of the line 12—12 of FIG. 2 in a cutting position.
Figure 17:
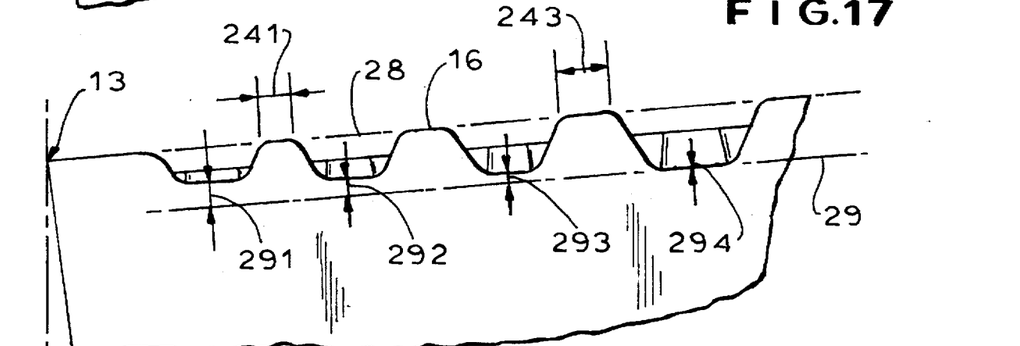
FIG. 17 is a view similar to FIG. 3 but illustrating a different embodiment.
Figure 18:
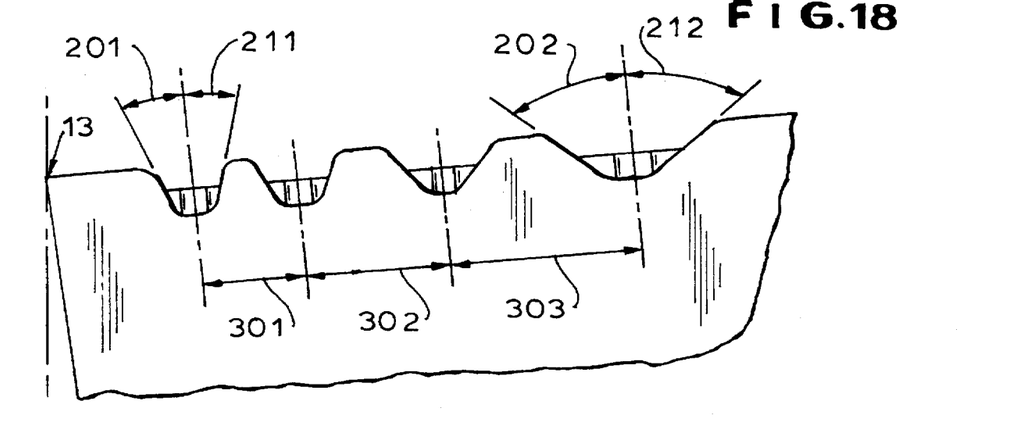
FIG. 18 is another view similar to FIG. 3 showing still another embodiment.

In FIGS. 16 through 18 several variations on the depths 22 and the trapezoid side angles 20 and 21 are shown. As visible in FIG. 16 the widths of the chip surface regions (here 241 to 243) surrounding the indentations 14 are larger as the distance from the cutting edge 13 increases. The width 23 of the cutting surface base 18 remains constant. Thus the spacing of the indentations 14 from each other is greater with larger distance from the cutting edge 13.

Simultaneously the spacing varies from the chip surface regions 16 to a plane 28 connecting the cutting corners 13. In this case there is a concave cutting edge path from a cutting corner 13 to the next cutting corner since the spacing 271 (equal to 0) to 273 increases. Meanwhile the base plane 29 defined by the chip-surface bases 18 of the indentations 14 is constant.

In the embodiment according to FIG. 17 the common envelope curve of the chip surface regions 16 lies in the region of the above-defined plane 28. Above all the depth of the indentations increases with increasing distance from the cutting corner 13 which is seen in ever smaller spacings 291 to 294 relative to a randomly selected plane 29. In the same manner the spacings 241 to 243 grow as in FIG. 16.

Another possible embodiment is the change of the trapezoid angles 201 and 211 to 202 and 212 which become greater with greater spacing from the cutting corner like the necessarily increasing spacings 301 to 303 of the indentations measured middle-to-middle in the same way. It is understood that the embodiments of FIGS. 16 through 18 can be put together in combinations of the invention.

Further embodiment variants are shown in FIGS. 19 to 26 which are sections perpendicular to the cutting edge 11 in the region of an indentation 14. In the embodiment shown in FIG. 19 the chip surface 16 and the chip-surface base 18 run convexly toward the cutting edge. The chip angle at which the chip surface 16 meets the cutting edge is at least 0° or positive while the chip surface angle of the chip-surface base 18 is negative.

Figure 20:
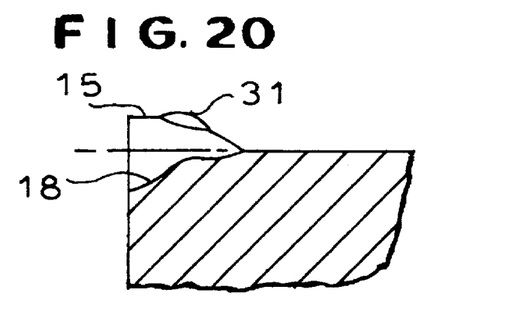

According to FIG. 20 the cutting insert has right next to a horizontally running bevel 15 a raised chip-forming element 31 which is part spherical, frustum shaped, or elongated. The chip-surface base 18 runs convexly but under a negative chip angle. In addition the entire width of the indentations or the center of the indentation has a raised further chip-forming element creating a corrugated shape corresponding to FIG. 20.

Figure 21:
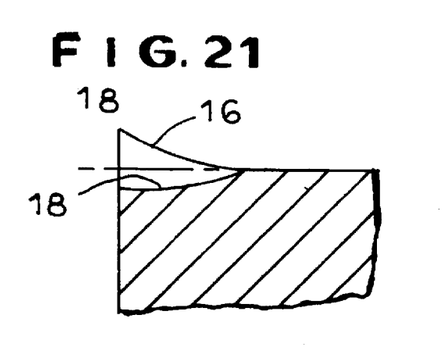

The chip surface regions 16 and the base 18 according to FIG. 21 are similarly concave but both surfaces end at a positive chip angle in the region of the cutting edge.

Figure 19:
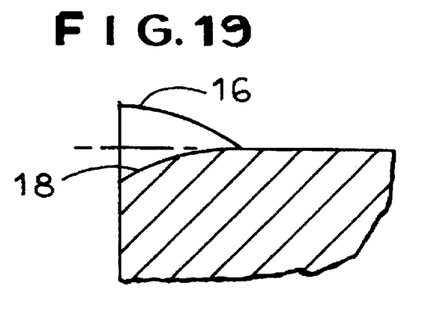
FIGS. 19 through 26 are respective partial sections of various embodiments of cutting edges.
Figure 22:
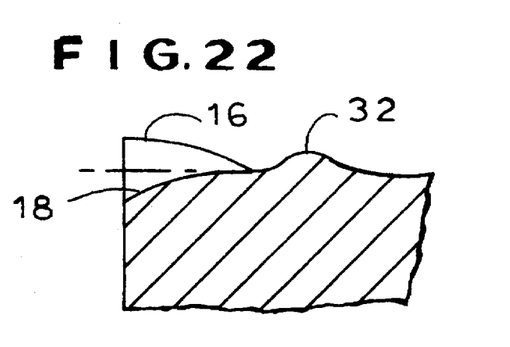

The embodiment according to FIG. 22 corresponds to the FIG. 19 embodiment except that right next to the convex path of the chip surface 16 and thus behind the indentations there are chip-forming elements 32 along the cutting edge which correspond to the above-described chip-forming elements 31.

Figure 23:
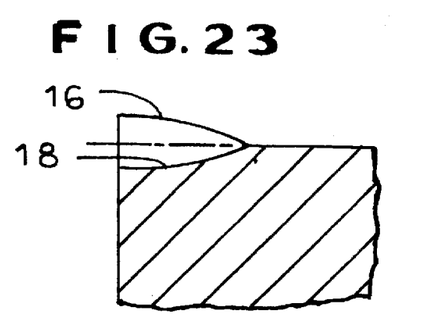

FIG. 23 shows the embodiment variant of a convex chip surface 16 and a concave chip-surface base 18.

Figure 24:
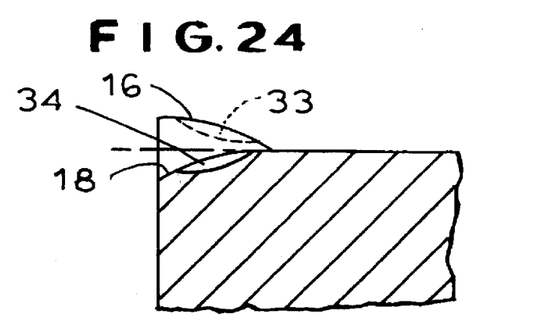

According to FIG. 24 the chip surface 16 and the chip-surface base 18 are also convex and both regions 16 and 18 have a groove 33 and 34 which runs toward the chip-surface center.

Figure 25:
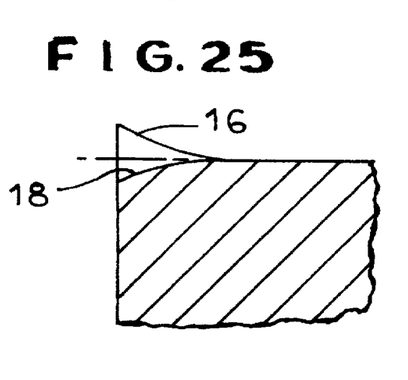
Figure 26:
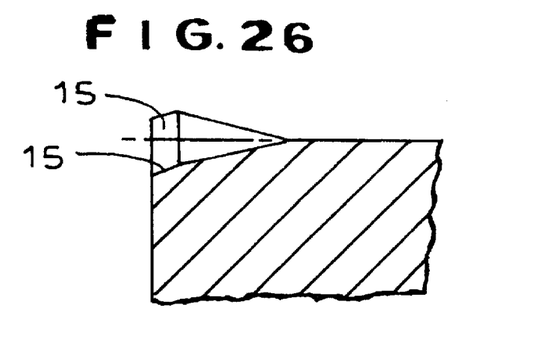
Figure 27:
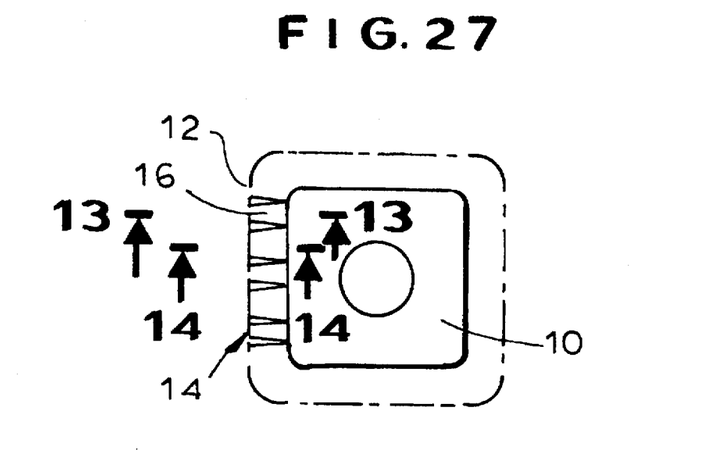
FIG. 27 is a top view of a cutting insert according to the invention in another embodiment.
Figure 28:
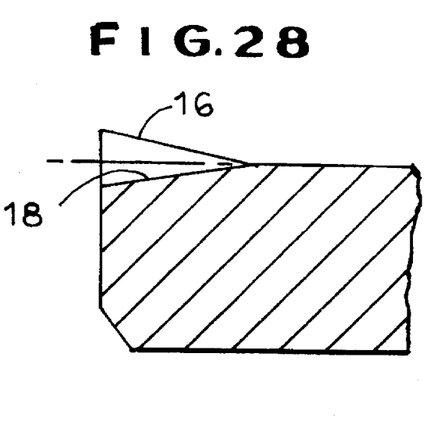
FIG. 28 is a section along the line 13—13 of FIG. 5.
Figure 29:
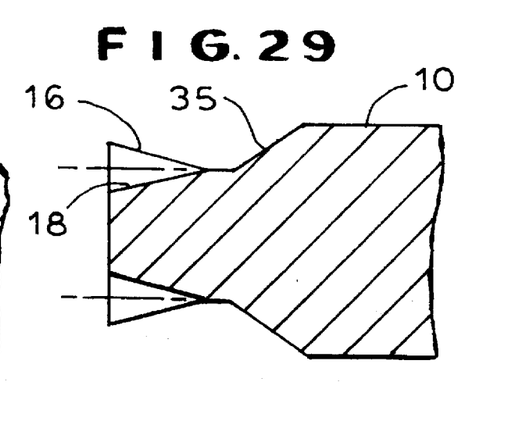
FIG. 29 is a section along the line 13—13 of a modification of the embodiment of FIG. 5.
Figure 30:
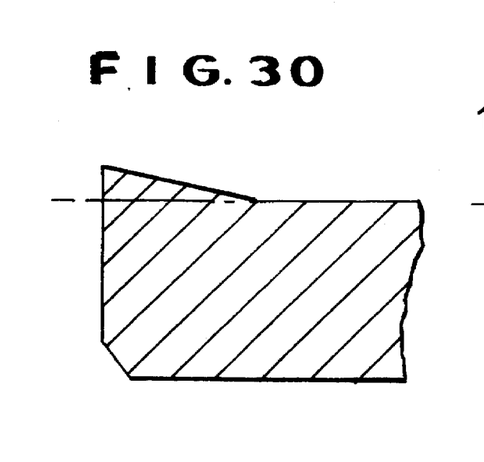
FIG. 30 is a section along the line 14—14 of FIG. 5 of the embodiment corresponding to FIG. 5.
Figure 31:
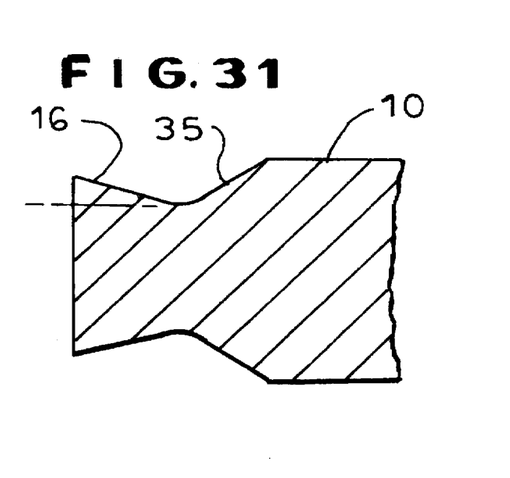
FIG. 31 is a section along the line 14—14 of FIG. 5 of the embodiment of FIG. 5.

FIG. 25 shows a cutting insert with a concavely descending chip surface 16 and a convex chip-surface base 18. In the embodiment shown in FIG. 26 the cutting edge has a bevel 15 which follows the contours of the chip surface 16 and that of the indentations. The bevel has in this case a negative chip angle. Variations on the individual features of the embodiments shown in FIGS. 19 through 26 are possible. FIG. 27 shows a square cutting plate which has a central chip surface 10 which can be either recessed with respect to the highest part of the cutting edge (FIGS. 28 and FIG. 30) or raised (FIGS. 29 and FIG. 31). In each case the chip surface region 16 extends at a positive chip-surface angle to the cutting edge 12. The chip-surface base 18 has a negative chip angle. Due to the raised shape of the chip surface 10 according to FIGS. 29 and 81 there is an additional transition region 35 between the chip-surface region 16 and the region 10. The embodiments shown in FIGS. 29 and 31 are different from those according to FIGS. 28 through 30 only in that the first-named plates are indexable cutting plates, that is usable on both sides.

Figure 32:
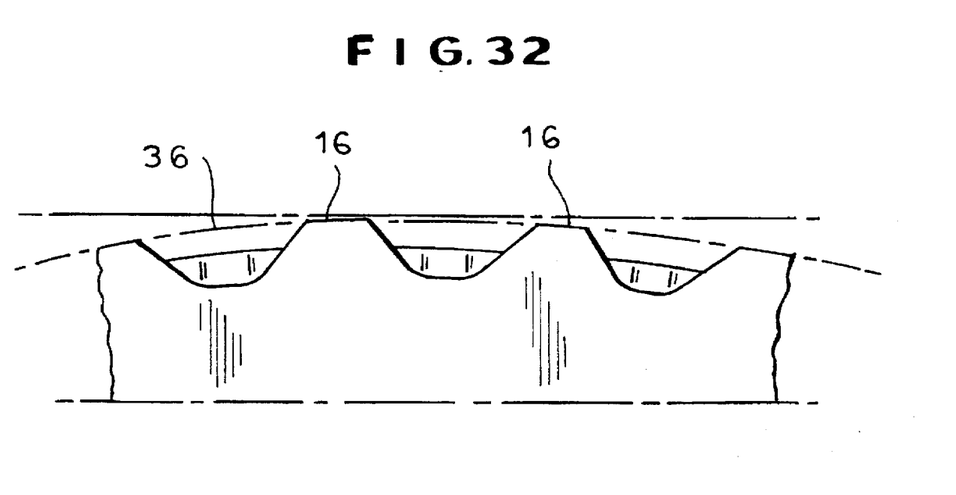
FIG. 32 is a fragmentary view of an embodiment or a cutting edge with a convex shape.
Figure 33:
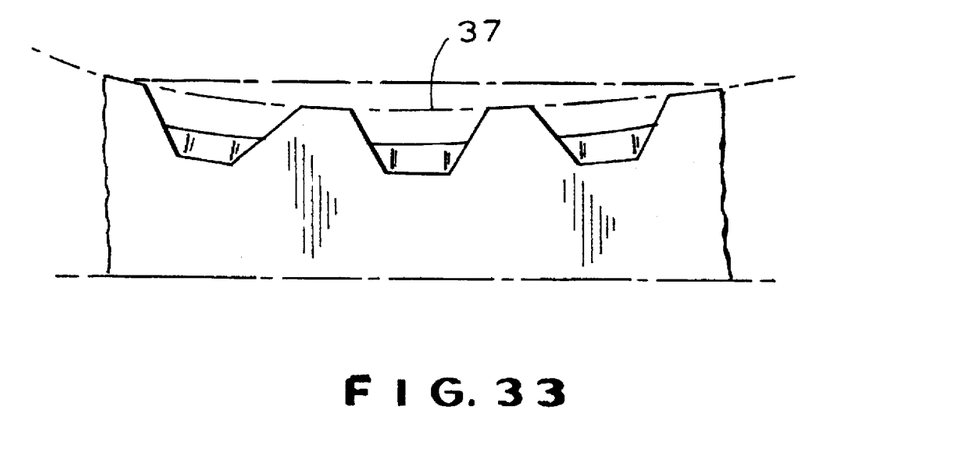
FIG. 33 is a fragmentary view of a cutting edge with a concave shape.

As shown in FIGS. 32 and 33 the envelope curves of the chip surface regions 16 on the one hand and the path of their chip-surfaces bases 8 on the other hand are convex (FIG. 32) or convex (FIG. 33). The shape of the envelope curve 36 generally follows the arcuate path of the connecting lines of the individual indentations 14. The same is true for the envelope curve 37 according to FIG. 33. According to the curvature there is in the cutting-corner region a negative or positive inclination angle.

Figure 34:
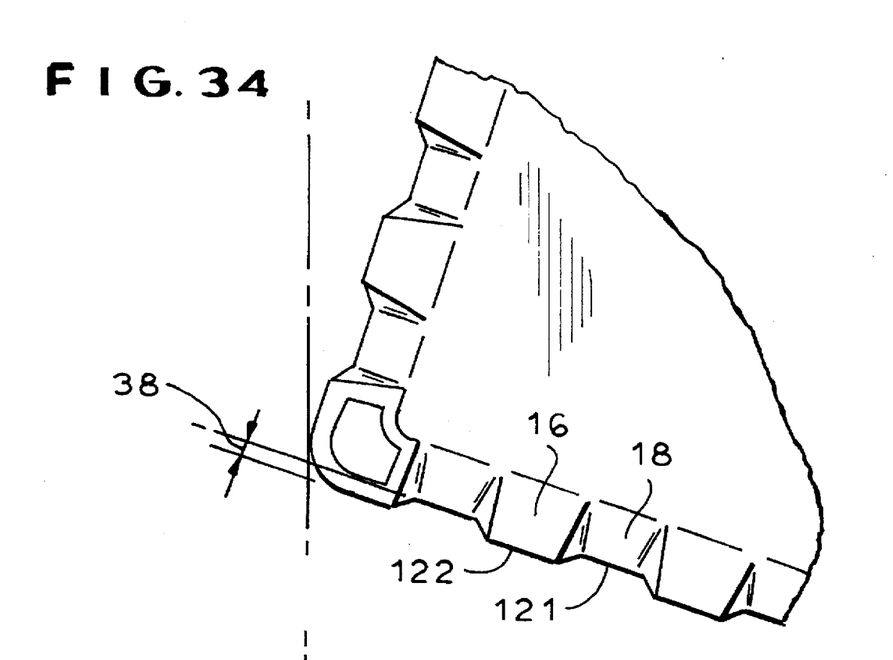
FIGS. 34 and 35 are top views of cutting inserts in the working position.
Figure 35:
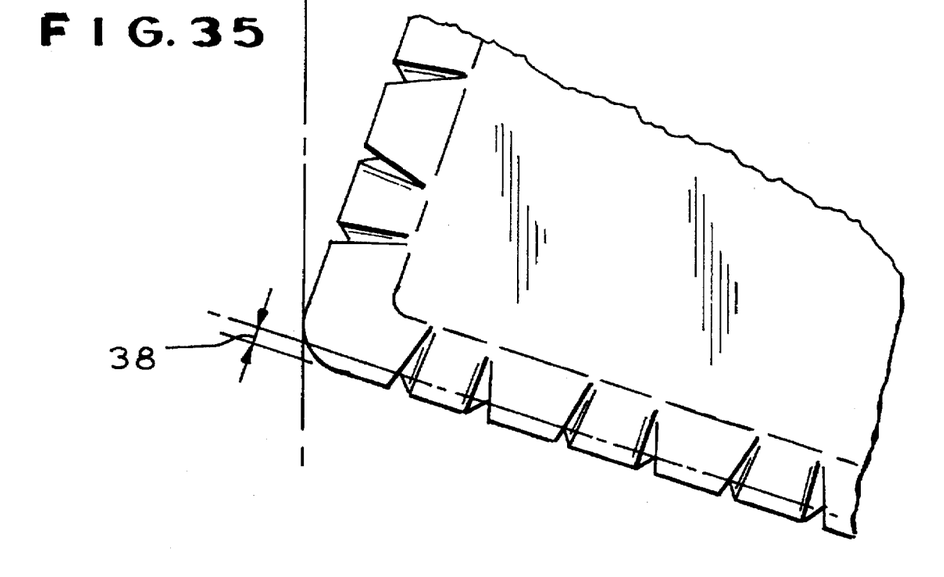

FIGS. 34 and 35 show respective embodiments of square indexable cutting plates in the work position with the difference being that in the case of the embodiment according to FIG. 34 the cutting edge 121 is set back in the region of the chip-surface base 18 relative to the cutting edge 122 in the region of the chip surface 16 by a distance 38 that depends on the inclination angle of the surfaces 16 and 18 from each other. In the embodiment of FIG. 35 in contrast this spacing 38 is compensated for in that the chip-surface base 18, that is the cutting edge 121, is extended to the plane of the cutting edge 122.

Figures 36, 37, 38, 39, 40, 41, 42, 43, 44:
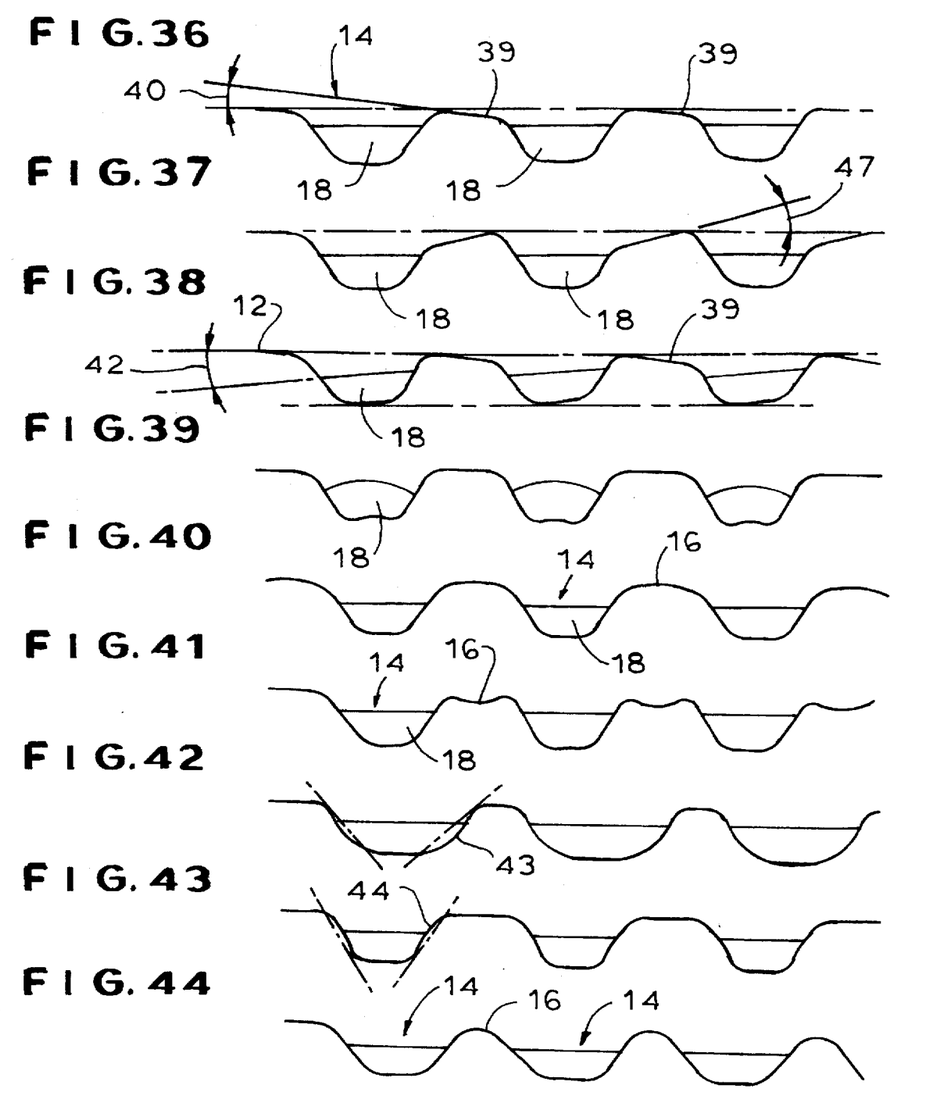
FIGS. 36 to 44 are respective front views of the edge surface of various embodiments.
Figure 45:
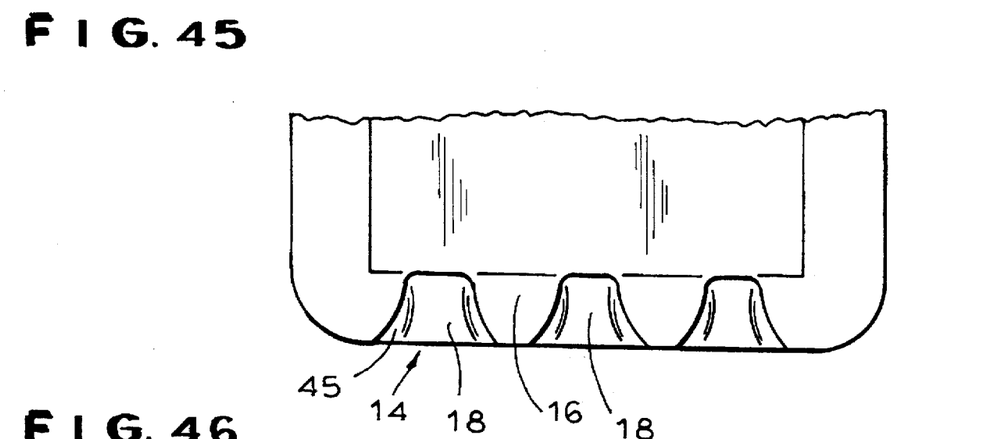
FIGS. 45 to 47 are top views of further embodiments of the invention.
Figures 46, 47:
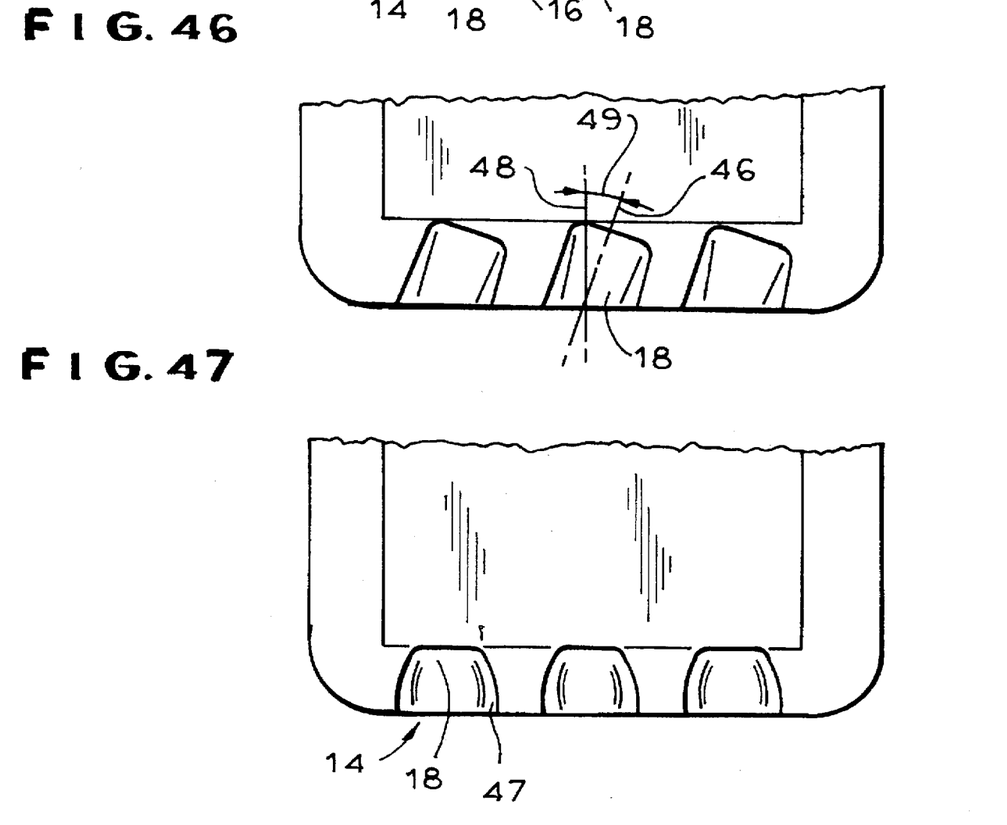

FIGS. 36 through 44 show further possible variants. Thus for example the chip-surface region 39 seen in the cutting edge direction can drop between the indentations, that is can extend at an angle 40 or can rise (angle 41). In addition as shown in FIG. 38, even the chip-surface base 18 of the indentations can be inclined at an angle 42 to the cutting edge 12 even together with inclined chip surfaces 39 or correspondingly rising chip surfaces as shown in FIG. 27.

In the embodiment according to FIG. 39 the chip-surface base 18 is convexly curved. It is also possible as shown in FIG. 40 to form the chip-surface regions 16 between the indentations 14 nonlinearly, either convex or concave (see FIG. 41).

Further variants corresponding to FIGS. 42 and 43 are constructed such that relative to imaginary planar trapezoid sides the actual trapezoid side path 43 is concave or convex as shown at reference 44. Finally it is possible as shown in FIG. 44 to form the chip-surface region 16 between two indentations 14 arcuately, that is without straight parts.

In addition it is possible within the scope of the present invention to form the trapezoid side surfaces convexly at the border with the chip surfaces 16 or chip-surface bases 18. As visible from FIG. 47 the actual trapezoid side surfaces 47 each run concavely. A further variant which can be used in FIGS. 1, 13, 27 or 34, 38 and FIG. 45, 47 is that the longitudinal axis. 46 runs at an acute angle 49 to a perpendicular 48 to the cutting edge. Correspondingly the rear extent of the chip-surface base 18 is inclined.

I claim:

1. In a cutting insert for chip-forming machining having a chip surface provided at a cutting edge with a plurality of indentations arranged in a row extending along the cutting edge and each having a generally trapezoidal sectional shape parallel to the cutting edge and perpendicular to the chip surface with trapezoidal sides open toward the chip surface, the improvement wherein the indentations each have a chip-surface base extending at a substantially negative chip angle to the cutting edge, the chip surface has in regions between the indentations at the cutting edge a positive chip angle of at least 5°, the indentations extend to and interrupt the cutting edge, and transitions from each chip-surface base to the respective trapezoidal sides or from the trapezoidal sides to the respective chip-surface regions between the indentations are rounded to a radius of at least 0.3 mm.

2. The cutting insert according to claim 1 wherein the trapezoidal shape of the indentations is axially symmetrical to a perpendicular from the cutting edge.

3. The cutting insert according to claim 1 wherein the indentations at cutting corners of the insert each have trapezoid sides with a steep inclination angle or narrow trapezoidal bases or small spacings between the indentations.

4. The cutting insert according to claim 1 wherein the trapezoidal sides open at angles of between 30° and 80°.

5. The cutting insert according to claim 4 wherein the negative chip angle of the trapezoidal base of the indentation lies between 0° and 20°.

6. The cutting insert according to claim 4 wherein the negative chip angle of the trapezoidal base of the indentation lies between 5° and 15°.

7. The cutting insert according to claim 1 wherein the positive chip angle of the chip surface surrounding the indentations is between 5° and 25°.

8. The cutting insert according to claim 1 wherein spacings of the indentations at the cutting edge are smaller than the width of the indentations or increase uniformly with increasing spacing from the cutting edge.

9. The cutting insert according to claim 8 wherein each indentation seen in a top view on the chip surface is generally rectangular.

10. The cutting insert according to claim 8 wherein each indentation seen in a top view on the chip surface is generally preferably trapezoidal.

11. The cutting insert according to claim 1 wherein the width of each indentation at the cutting edge is between 0.5 mm and 4 mm.

12. The cutting insert according to claim 1 wherein the cutting edge has a bevel.

13. The cutting insert according to claim 12 wherein the angle between the bevel lying in the chip-surface plane and the positive chip-surface region between the indentations itself as well as between this bevel and the negative chip-surface base of the indentation is between 160° and 175°.

14. The cutting insert according to claim 1 wherein the chip-surface base of the indentation or the surrounding chip surface is formed with an additional chip groove.

15. The cutting insert according to claim 1 wherein the chip surface surrounding the insert has at a spacing from the cutting edge raised chip-forming elements.

16. The cutting insert according to claim 1 wherein the chip surface has along the cutting edge from cutting corner to cutting corner a convex or concave envelope curve.

17. The cutting insert according to claim 16 wherein the depth or the spacing of the indentations increases from the cutting corners to a middle of the cutting edge.

18. The cutting insert according to claim 1 wherein the transitions are rounded with a radius of at most 3 mm.

19. The cutting insert according to claim 1 wherein the positive chip angle of the chip surface surrounding the indentations is between 5° and 20°.

20. The cutting insert according to claim 1 wherein the chip surface surrounding the insert has at a spacing from the cutting edge raised chip-forming elements shaped as pyramidal or conical frustums.

* * * * *